United States Patent
Kawata

(10) Patent No.: US 7,616,100 B2
(45) Date of Patent: Nov. 10, 2009

(54) ANTITHEFT SYSTEM

(75) Inventor: Kenji Kawata, Okazaki (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 11/500,319

(22) Filed: Aug. 8, 2006

(65) Prior Publication Data

US 2007/0103278 A1   May 10, 2007

(30) Foreign Application Priority Data

Sep. 16, 2005   (JP) .............................. 2005-270848

(51) Int. Cl.
*B60R 25/10* (2006.01)
(52) U.S. Cl. .................. 340/429; 180/400; 75/862.331; 324/207.2
(58) Field of Classification Search ................. 340/429; 180/400; 73/862.331; 324/207.2
See application file for complete search history.

(56) References Cited

U.S. PATENT DOCUMENTS

| | | | |
|---|---|---|---|
| 5,457,438 A | | 10/1995 | Ziegler |
| 6,795,752 B1 * | | 9/2004 | Zhao et al. .................. 700/299 |
| 6,885,924 B2 * | | 4/2005 | Ford et al. .................... 701/36 |
| 6,885,942 B2 * | | 4/2005 | Shray et al. ..................... 702/6 |
| 2002/0131472 A1 * | | 9/2002 | Draxton et al. ............. 374/115 |
| 2005/0151448 A1 * | | 7/2005 | Hikida et al. ............... 310/338 |
| 2005/0236219 A1 * | | 10/2005 | Saito et al. ................... 180/433 |
| 2006/0082448 A1 * | | 4/2006 | Maeda ........................ 340/428 |
| 2006/0213070 A1 * | | 9/2006 | Goldsobel et al. ......... 33/366.21 |
| 2006/0271295 A1 * | | 11/2006 | McLaren et al. ............. 701/216 |
| 2007/0080792 A1 * | | 4/2007 | Fukagawa et al. ........... 340/429 |

FOREIGN PATENT DOCUMENTS

| | | |
|---|---|---|
| DE | 101 10 493 | 9/2002 |
| EP | 0 266 282 | 5/1988 |
| JP | A-4-159164 | 6/1992 |

OTHER PUBLICATIONS

Office Action dated Jun. 24, 2008 in corresponding German patent application No. 10 2006 041 848.4-51 (and English translation).

* cited by examiner

*Primary Examiner*—Benjamin C Lee
*Assistant Examiner*—Ojiako Nwugo
(74) *Attorney, Agent, or Firm*—Posz Law Group, PLC

(57) ABSTRACT

An antitheft system for use in a vehicle includes an angle sensor for outputting a signal that represents a body angle of the vehicle, an angle variation determination unit for determining an angle variation of the body angle at a predetermined interval based on the signal outputted from the angle sensor, a theft detection unit for determining whether the vehicle is in a theft condition based on a comparison of the angle variation with a predetermined value, and a temperature sensor for sensing temperature of the angle sensor. The angle variation determination unit compensates the signal from the angle sensor based on the temperature of the angle sensor sensed by the temperature sensor before determining the angle variation.

12 Claims, 4 Drawing Sheets

ANTITHEFT SYSTEM

CROSS REFERENCE TO RELATED APPLICATION

This application is based on and claims the benefit of priority of Japanese Patent Application No. 2005-270848 filed on Sep. 16, 2005, the disclosure of which is incorporated herein by reference.

FIELD OF THE INVENTION

The present invention generally relates to an antitheft system for use in a vehicle.

BACKGROUND OF THE INVENTION

In recent years, an antitheft system for use in a vehicle determines whether the vehicle is in a condition of theft based on an inclination angle of the vehicle detected by an angle sensor. That is, the inclination angle is continuously monitored to calculate a change of the inclination angle, and the change of the inclination angle is compared with a predetermined value for detecting the theft of the vehicle. For example, Japanese patent document JP-A-H4-159164 discloses a technique that detects vehicle theft in above-described manner.

The angle sensor outputs an angle signal to an amplifier, and the signal is amplified by the amplifier. The signal from the amplifier passes a filter. Then, the signal is inputted to a microcomputer for processing. In this case, the signal inputted to the microcomputer is affected by a change of the temperature, that is, a signal value suffers from a temperature drift.

The temperature drift that affects the signal value is compensated by using plural calculation units in the disclosure of the above patent document. That is, the calculation units compare the signal value with a predetermined threshold for updating an initial value that is used in an angle calculation at a predetermined interval in respective calculation units. In this manner, accumulation of the temperature drift of the signal value is prevented. In addition, the initial value of the angle calculation is different in each of the calculation units. In this manner, outputs from the calculation units are compensated with each other for detecting the change of the inclination angle that can not be detected by a single calculation unit.

However, even when the initial value of the angle calculation is periodically updated, a sudden change of the temperature in a large amount causes the temperature drift of the signal value that cannot be compensated in terms of preventing a false detection.

SUMMARY OF THE INVENTION

In view of the above-described and other problems, the present disclosure provides an antitheft system that accurately prevents a false detection of vehicle theft.

The antitheft system for use in a vehicle includes an angle sensor for outputting a signal that represents a body angle of the vehicle, an angle variation determination unit for determining an angle variation of the body angle at a predetermined interval based on the signal outputted from the angle sensor, a theft detection unit for determining whether the vehicle is in a theft condition based on a comparison of the angle variation with a predetermined value, and a temperature sensor for sensing temperature of the angle sensor. The angle variation determination unit compensates the signal from the angle sensor based on the temperature of the angle sensor sensed by the temperature sensor before determining the angle variation.

The antitheft system in the present disclosure detects the temperature of the angle sensor, and uses the detected temperature for temperature compensation of the signal from the angle sensor. In this manner, the angle variation based on the detected angles is accurately determined even when the temperature of the angle sensor changes by a large amount. Therefore, false detection of vehicle theft is prevented due to the accuracy of the detected temperature by the temperature sensor.

The temperature signal may be derived from, for example, the temperature sensor in a gyro sensor in the vehicle. The temperature detected by the temperature sensor is used for the temperature compensation of the signal from the angle sensor in the same manner.

In another aspect of the present disclosure, the signal from the temperature sensor is evaluated in terms of variation in a predetermined period. In this manner, false detection of the vehicle theft is prevented when the variation of the signal exceeds a predetermined value due to a breakdown of the sensor.

Further, a warning sound is provided from a horn or the like when the vehicle is determined to be in a theft condition. Therefore, preventing a false detection of the theft condition is of great interest in terms of actually implementing the antitheft system in a vehicle.

Furthermore, the angle sensor and the temperature sensor are disposed on the same substrate, or in the same case. In this manner, accuracy of the detected temperature is improved, thereby improving the accuracy of the detected angle.

Furthermore, the angle sensor and the temperature sensor are preferably isolated from a power supply circuit. In this manner, the angle sensor and the temperature sensor are prevented from the influence of heat from the power supply circuit, thereby enabling the improvement of the accuracy of the detected angle.

Furthermore, the temperature may be detected by various components that is coupled with the antitheft system. For example, an electronic stabilization system may be coupled with the antitheft system, and the temperature signal detected by a sensor in the stabilizing system may be used for compensation of the detected angle. In this manner, a cost-performance of the antitheft system is improved.

Furthermore, the signal from the angle sensor in the antitheft system is appropriately compensated even when the angle sensor is an acceleration detection mechanism such as a piezo-resistor or the like. That is, the influence of the temperature change that deteriorates the accuracy of the acceleration detection mechanism can be precisely compensated by having the above-described compensation scheme for improved usability.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. The embodiments of the present disclosure are not necessarily limited to the types/forms in the present embodiment, but may take any form of the art or technique that is regarded within the scope of the present disclosure by artisans who have ordinary skill in the art.

First Embodiment

Figure 1:
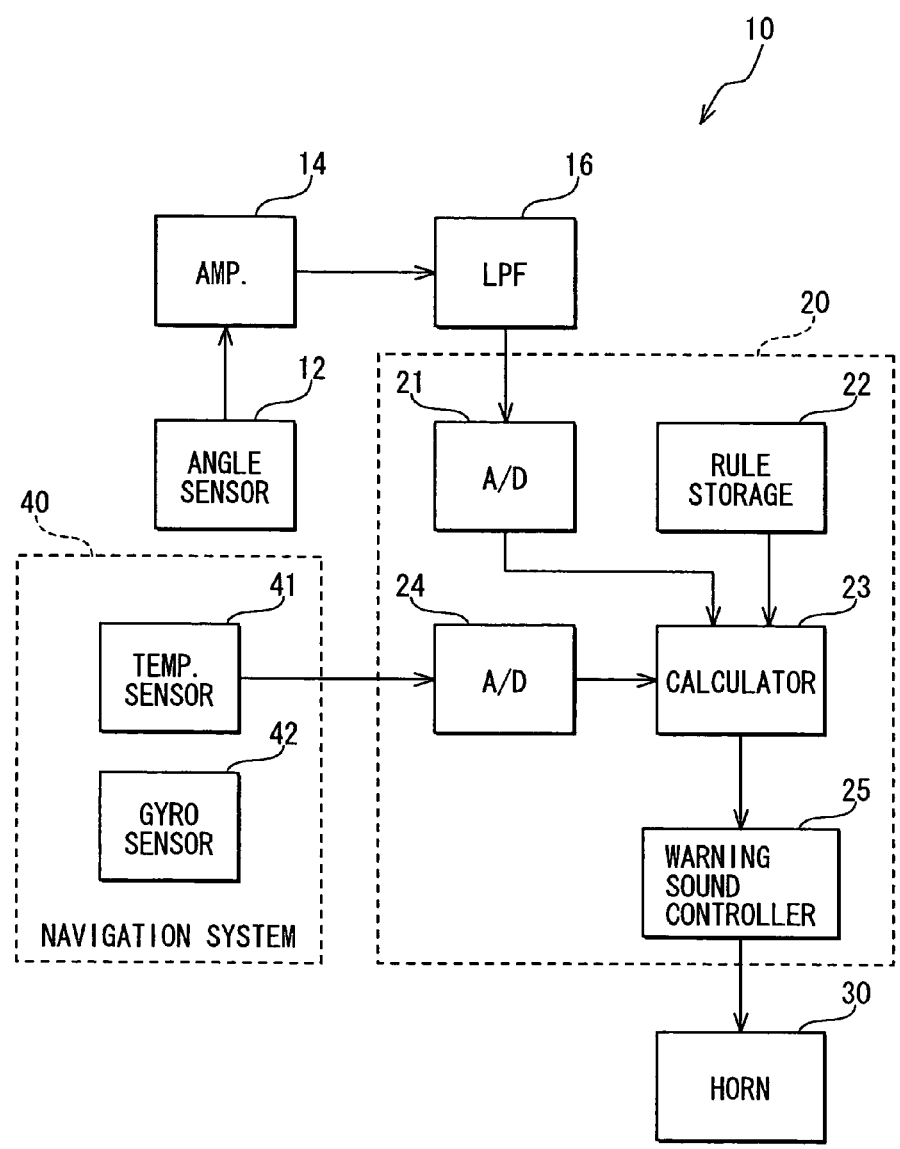
FIG. 1 shows a block diagram of an antitheft system in a first embodiment of the present disclosure.

FIG. 1 shows a block diagram of an antitheft system 10 in a first embodiment of the present disclosure.

As shown in FIG. 1, the antitheft system 10 includes an angle sensor 12, an amplifier 14, a low-pass filter 16, an arithmetic controller 20, and a horn 30. The angle sensor 12 detects an inclination angle of a vehicle body. The horn 30 provides a warning sound for surrounding objects of the vehicle. The antitheft system 10 further includes other sensors such as an intrusion sensor for detecting an intrusion into a vehicle, an impact sensor for detecting an impact applied on the vehicle or similar sensors (not shown in the figure).

The angle sensor 12 may detect the inclination angle by various manners. That is, the angle sensor 12 may determine the inclination angle by detecting change in an acceleration of gravity, or may use a pendulum. The acceleration detection type angle sensor 12 may be a piezo-resistor type sensor, an electro capacitance type sensor, a magnetism sensor type sensor or the like that are easily affected by environmental change including temperature. The angle sensor 12 outputs an inclination angle signal upon detecting the inclination angle of the vehicle body.

The amplifier 14 amplifies the inclination angle signal from the angle sensor 12 in a predetermined manner. The low-pass filter 16 removes a noise from an output signal of the amplifier 14, and outputs the signal to the arithmetic controller 20. The signals outputted from the angle sensor 12, the amplifier 14 and the low-pass filter 16 are equally called the inclination angle signal in the following.

The arithmetic controller 20 includes a CPU, a ROM, a RAM, and an I/O port, and serves as a well-known type microcomputer. The arithmetic controller 20 has an A/D converter 21, a rule storage 22, a calculator 23, an A/D converter 24, and a warning sound controller 25.

The arithmetic controller 20 receives the inclination angle signal from the low-pass filter 16, and also receives a temperature signal from a temperature sensor 41 in a navigation system 40. The navigation system 40 has a gyro sensor 42 for relative bearing angle, and the temperature sensor 41 in the navigation system 40 compensates a relative bearing angle signal from the gyro sensor 42 when the bearing angle signal suffers from temperature change. In the present embodiment, temperature detected by the temperature sensor 41 is considered as the temperature of the angle sensor 12. That is, the temperature sensor 41 of the navigation system 40 serves as a temperature sensor of the angle sensor 12. The navigation system 40 is disposed in a secured space on the vehicle in terms of protection from heat source, e.g., an engine or the like.

The inclination angle signal from the low-pass filter 16 is converted to a digital value by the A/D converter 21, and is outputted to the calculator 23. The temperature signal from the temperature sensor 41 is converted to a digital value by the A/D converter 24, and is also outputted to the calculator 23.

The rule storage 22 is, for example, an EEPROM for storing a preset rule that determines a theft condition based on the signal from the angle sensor 12 and/or other sensors (the intrusion sensor, the impact sensor etc.).

The calculator 23 determines whether the vehicle is in the theft condition based on the inclination angle signal and the preset rule stored in the rule storage 22 on demand (Theft decision, hereinafter). The calculator 23 uses the signal from the temperature sensor 41 for determining whether the theft decision is reliable prior to the theft decision.

The warning sound controller 25 controls a warning sound provided by the horn 30. The warning sound is provided by the horn 30 toward an outside of the vehicle when the vehicle is determined to be in the theft condition.

Figure 2:
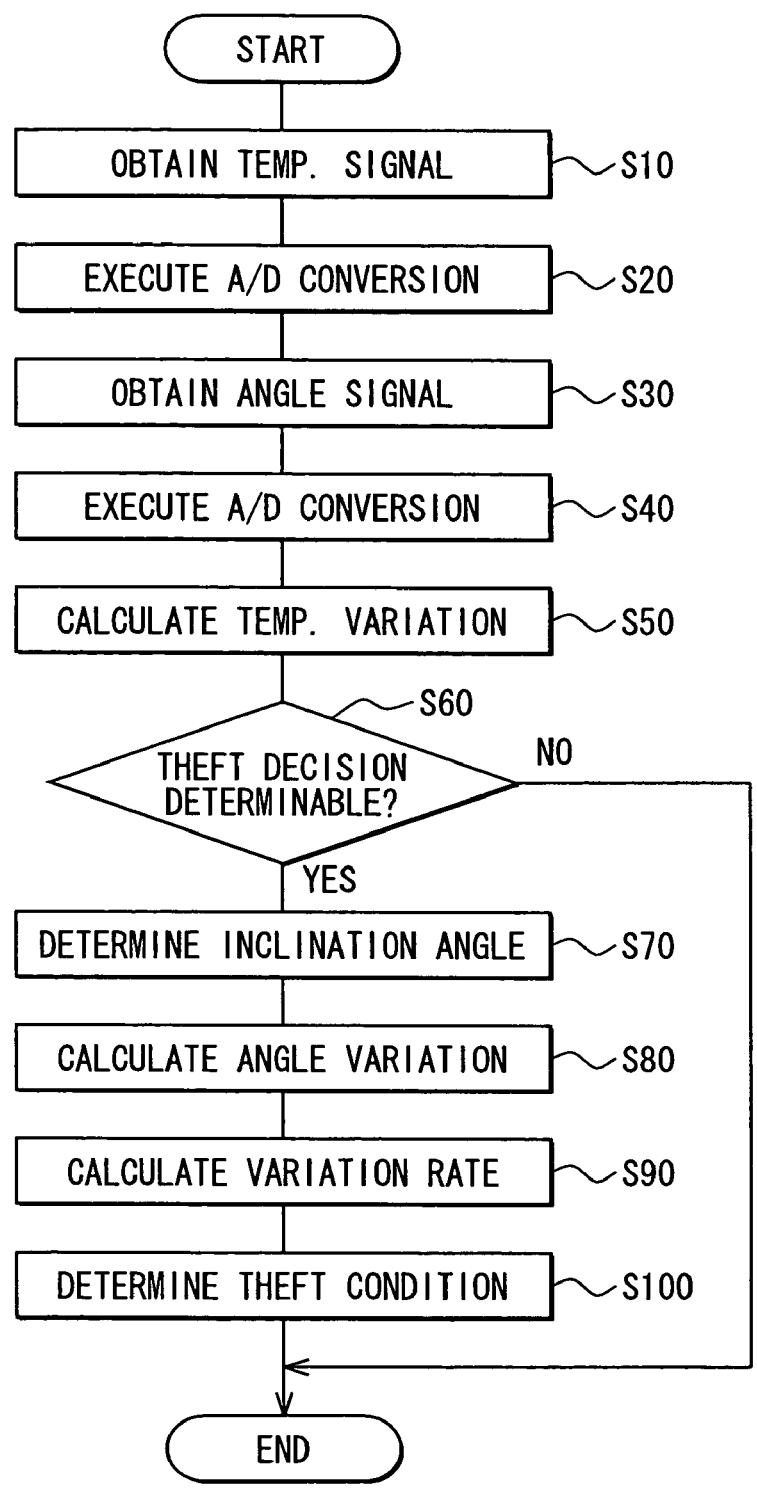
FIG. 2 shows a flowchart of a control process in a calculation unit in FIG. 1.

FIG. 2 shows a flowchart of a control process in the calculator 23 in FIG. 1. The control process is repeated at a predetermined interval, e.g., at every second.

In step S10, the process obtains the temperature signal from the temperature sensor to the A/D converter 24.

In step S20, the process executes A/D conversion for the temperature signal obtained from the sensor.

In step S30, the process obtains the inclination angle signal from the angle sensor 12. to the A/D converter 21.

In step S40, the process executes A/D conversion for the angle signal obtained from the sensor.

In step S50, the process calculates temperature variation by subtracting a previous temperature value from a current temperature value. The difference between the two values is calculated as the temperature variation.

In step S60, the process determines whether the theft decision is determinable. That is, the temperature variation is compared with a predetermined value of determination discontinuation. When the variation is equal to or greater than the determination discontinuation value, the process determines that the theft decision is not determinable, and concludes the process (step S60:NO). The process proceeds to step S70 when the variation is smaller than the determination discontinuation value (step S60:YES).

The determination discontinuation value is determined based on various temperature variation derived from plural temperature environment by having actual temperature measurement. The determination discontinuation value defines a maximum temperature variation value for the temperature sensor 41 that is working properly for the predetermined interval by examining an operation condition of the temperature sensor 41. In this manner, a false theft alarm based on the signal from the angle sensor 12 which is compensated by the temperature sensor 41 having trouble is prevented.

More practically, the determination discontinuation value is determined in the following manner. When the influence of the temperature variation (so-called temperature drift) is 0.1 degrees/° C., and a theft decision inclination angle (described later) is 2 degrees, the determination discontinuation value is set as the temperature variation value that yields the temperature drift of 80% of the theft decision inclination angle (1.6 degrees). In this case, the temperature variation value of 16 is used as the determination discontinuation value.

In step S70, the process determines the inclination angle of the vehicle body based on the temperature signal and the inclination angle signal converted to digital values respectively in steps S20, S40. The inclination angle of the vehicle body is determined by applying a temperature compensation relationship (i.e., a compensation map) to the temperature signal and the inclination angle signal. The compensation map is determined based on an experiment, and is stored in, for example, the EEPROM.

The temperature compensation in a process of inclination angle determination is required because the angle sensor 12 of any type is not free from the temperature drift of an output signal value for various reasons. For example, the piezo-resistor type angle sensor suffers from a defect of the piezo-resistor, or a temperature characteristic of a gas that is used to seal the resistor. Further, the amplifier 14 and the low-pass filter 16 also have temperature characteristics respectively. Therefore, the temperature compensation relationship is determined by considering all those characteristics.

In step S80, the process calculates inclination angle variation by subtracting a previous inclination angle value from a current inclination angle value. The difference between the two values is calculated as the inclination angle variation.

In step S90, the process calculates a variation rate of the inclination angle variation. For example, the variation rate is calculated and determined as a percentage of the angle variation calculated in step S80 against the inclination angle calculated in the current process or the previous process.

In step S100, the process determines whether the vehicle is in the theft condition based on a preset rule stored in the rule storage 22. For example, the preset rule of theft condition includes the following conditions. That is, (1) the inclination angle of the vehicle body is equal to or greater than 2 degrees, (2) the variation rate is within a preset value, (3) the number of rolling/pitching of the vehicle body is within the preset value, and the like. When the vehicle is determined to be in the theft condition based on the above rule, the warning sound controller 25 controls the horn 30 for providing the warning sound toward the outside of the vehicle.

The antitheft system of the present disclosure determines the inclination angle of the vehicle body based on the compensation by using the temperature detected by the temperature sensor 41. Then, the inclination angle variation is calculated based on the compensated inclination angles. Therefore, the angle variation value is prevented from being influenced by the temperature variation, that is, the angle variation value is not under the influence of the temperature drift. In this manner, vehicle theft condition is precisely determined and a false warning sound for warning the theft of the vehicle is prevented. Further, the temperature signal from the temperature sensor 41 is shared with the gyro sensor 42, thereby achieving the above-described advantage without compromising cost-effectiveness of the anti-theft system.

Second Embodiment

A second embodiment of the present disclosure is described with reference to the drawings. In the second embodiment, like parts have like numbers, and the description of the disclosure is focused to the difference between the first embodiment and the second embodiment.

Figure 3:
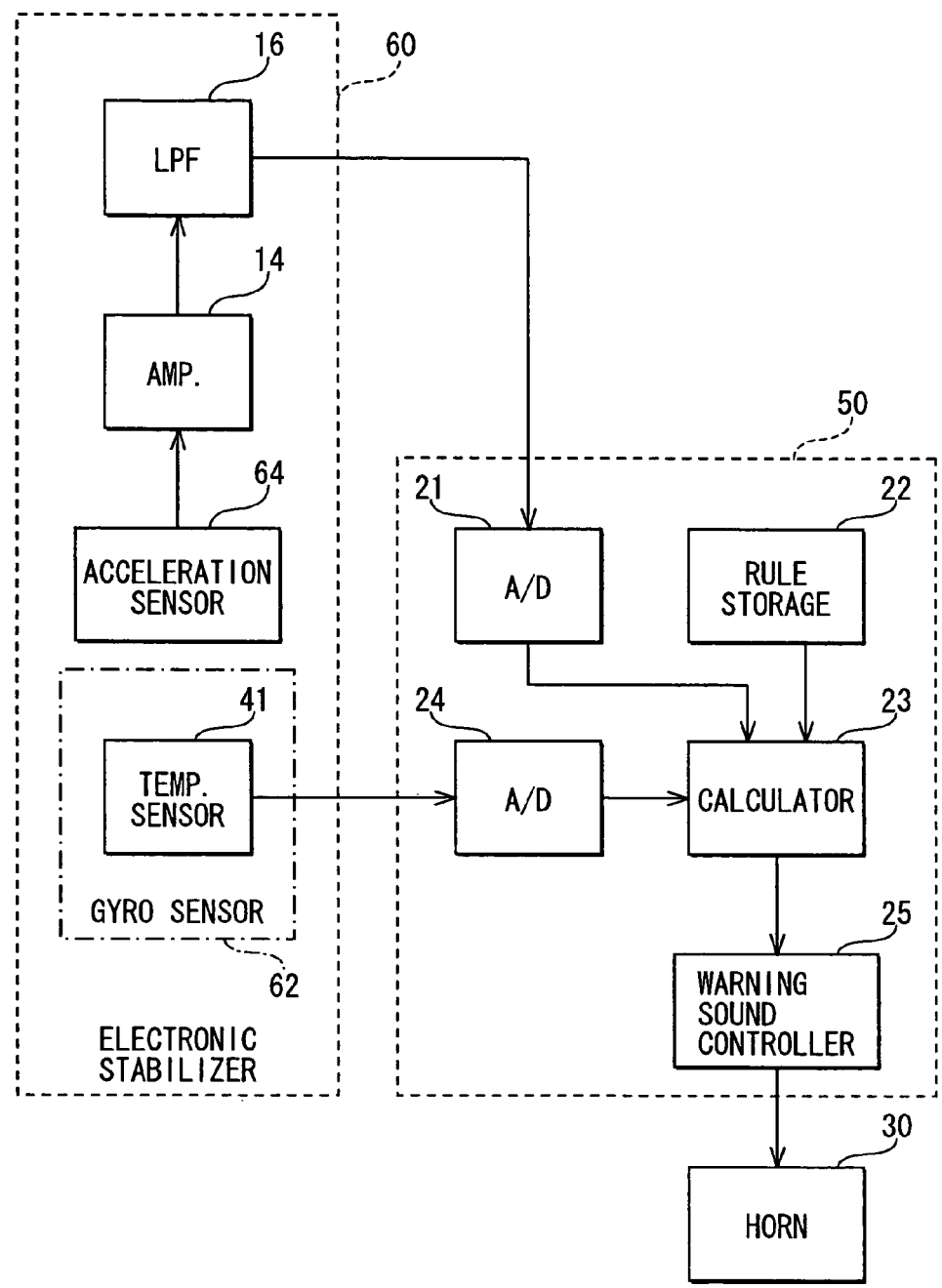
FIG. 3 shows a block diagram of the antitheft system in a second embodiment of the present disclosure.

FIG. 3 shows a block diagram of an antitheft system 50 in the second embodiment of the present disclosure. The antitheft system 50 in the second embodiment is coupled with an electronic stabilizer 60 on the vehicle. The electronic stabilizer 60 includes an acceleration sensor 64 for detecting a lateral acceleration of the vehicle body, the amplifier 14 for amplifying the signal from the acceleration sensor 64, the low-pass filter 16 for removing a noise from the signal from the amplifier 14 and the like. The electronic stabilizer 60 controls an output of an engine and/or braking operation for automatically reducing a wheel rotation speed. The gyro sensor 62 includes the temperature sensor 41 that is used to compensate a gyro signal by detecting the temperature.

The acceleration sensor 64 included in the electronic stabilizer 60 is the difference of the second embodiment. That is, the antitheft system 50 does not have the acceleration sensor 64. Use of the temperature sensor 41 included in other device, i.e., the electronic stabilizer 60 in this case, is the same scheme as the first embodiment. In this manner, the antitheft system 50 in the second embodiment has the same structure as the arithmetic controller 20 in the first embodiment, thereby having the same advantage in terms of compensation of the temperature drift of the angle variation.

Although the present disclosure has been fully described in connection with the preferred embodiments thereof with reference to the accompanying drawings, it is to be noted that various changes and modifications will become apparent to those skilled in the art.

For example, the temperature of the angle sensor 12 is detected by a dedicated temperature sensor instead of the temperature sensor 41 for detecting the temperature of the gyro sensor 42. In this manner, the temperature of the angle sensor 12 is more precisely detected.

Figure 4:
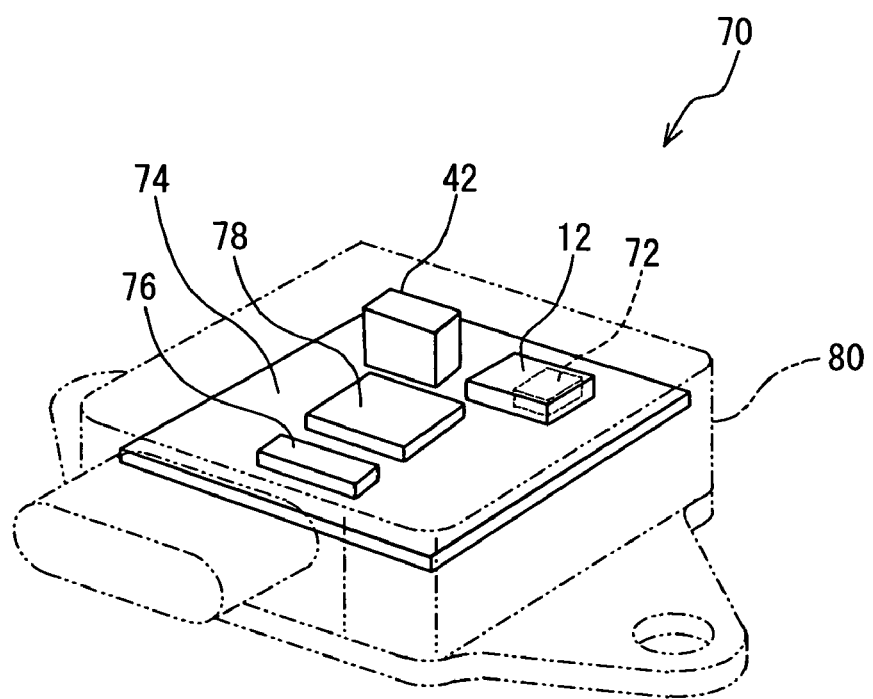
FIG. 4 shows a perspective view of the antitheft system that has a different structure from the antitheft systems in the first and second embodiment.

FIG. 4 shows a perspective view of an antitheft system 70 that has a different structure from the antitheft systems 10, 50 in the first and second embodiment. The antitheft system 70 has a power unit 76, a microcomputer 78, the gyro sensor 42, and the angle sensor 12. These components of the antitheft system 70 are disposed on a substrate 74. The substrate 74 is housed in a case 80.

The microcomputer 78 has a function of the arithmetic controller 20, the amplifier 14, and the low-pass filter 16 described in the first embodiment. The microcomputer 78 is disposed at a position between the power unit 76 and the gyro sensor 42/the angle sensor 12 as shown in FIG. 4.

The antitheft system 70 has an improved accuracy of the angle variation value based on the preciseness of the temperature detected by a temperature sensor 72 installed in the angle sensor 12.

Further, the temperature sensor 72 may be disposed on the same substrate 74 as the angle sensor 12, or may be disposed on a different substrate from the angle sensor 12 as long as the different substrate is in the same case 80. The temperature sensor 72 detects the temperature of the angle sensor 12 by the same accuracy, thereby enabling the antitheft system 70 to achieve the same advantage as the systems in the above-described embodiments.

Furthermore, the temperature sensor for detecting the temperature of the angle sensor 12 may be disposed in any position that is close to the angle sensor 12. The temperature sensor may also be disposed in a position where temperature change has a same pattern as the angle sensor 12.

Furthermore, the warning sound for warning the condition of vehicle theft from the horn 30 may be replaced with a notification to an owner of the vehicle, to a security company or the like. The notification is provided in addition to the warning sound.

The compensation of the influence of the temperature change may be applied to the inclination angle (step S70), to the angle variation value, or to any process that takes place prior to the determination of the theft condition.

Such changes and modifications are to be understood as being within the scope of the present invention as defined by the appended claims.

What is claimed is:

1. An antitheft system for use in a vehicle that is equipped with a gyro sensor and a temperature sensor for sensing temperature of the gyro sensor so as to provide temperature compensation for a signal from the gyro sensor, the antitheft system comprising:
an angle sensor for outputting a signal that represents a body angle of the vehicle;
an angle variation determination unit for determining an angle variation of the body angle at a predetermined interval based on the signal outputted from the angle sensor;
a theft detection unit for determining whether the vehicle is in a theft condition based on a comparison of the angle variation with a predetermined value; and
a temperature variation calculator for calculating an amount of temperature variation of the temperature detected by the temperature sensor,
wherein the angle variation determination unit is configured to receive, as the temperature of the angle sensor, the temperature of the gyro sensor, and compensates the signal from the angle sensor based on the temperature of the angle sensor sensed by the temperature sensor before determining the angle variation,
wherein the theft detection unit discontinues determination of the theft condition when the amount of the temperature variation is equal to or greater than a predetermined value.

2. The antitheft system as in claim 1 further comprising:
a warning sound output unit for outputting a warning sound toward an outside of the vehicle; and
a sound controller for controlling an output of the warning sound from the warning sound output unit when the theft detection unit determines that the vehicle is in the theft condition.

3. The antitheft system as in claim 1,
wherein the angle sensor and the temperature sensor are housed in a single case.

4. The antitheft system as in claim 3,
wherein the power supply circuit is housed in the single case, and
another electronic component is disposed in a position that separates the power supply circuit from the angle sensor and the temperature sensor.

5. The antitheft system as in claim 1,
wherein the angle sensor has the temperature sensor integrated therein.

6. The antitheft system as in claim 1,
wherein the angle sensor is a piezo-resistor type acceleration sensor.

7. The antitheft system as in claim 1,
wherein the angle sensor is an electric capacitance type acceleration sensor.

8. The antitheft system as in claim 1, the temperature form the gyro sensor being received from a navigation system disposed in a secured space in the vehicle.

9. An antitheft system for use in a vehicle comprising:
an angle sensor for outputting a signal that represents a body angle of the vehicle;
an angle variation determination unit for determining an angle variation of the body angle at a predetermined interval based on the signal outputted from the angle sensor;
a theft detection unit for determining whether the vehicle is in a theft condition based on a comparison of the angle variation with a predetermined value;
a temperature sensor for sensing temperature of the angle sensor; and
a temperature variation calculator for calculating an amount of temperature variation of the temperature detected by the temperature sensor,
wherein the angle variation determination unit compensates the signal from the angle sensor based on the temperature of the angle sensor sensed by the temperature sensor before determining the angle variation,
wherein the theft detection unit discontinues determination of the theft condition when the amount of the temperature variation is equal to or greater than a predetermined value.

10. An antitheft system for use in a vehicle comprising:
an angle sensor for outputting a signal that represents a body angle of the vehicle;
an angle variation determination unit for determining an angle variation of the body angle at a predetermined interval based on the signal outputted from the angle sensor;
a theft detection unit for determining whether the vehicle is in a theft condition based on a comparison of the angle variation with a predetermined value; and
a temperature sensor for sensing temperature of the angle sensor,
wherein the angle variation determination unit compensates the signal from the angle sensor based on the temperature of the angle sensor sensed by the temperature sensor before determining the angle variation,
the angle sensor and the temperature sensor being disposed on a same substrate,
wherein the substrate has a power supply circuit disposed thereon, and
the power supply circuit is separated from the angle sensor and the temperature sensor by another electronic component disposed on the substrate.

11. An antitheft system for use in a vehicle that is equipped with a gyro sensor for detecting a roll of the vehicle, a temperature sensor for sensing temperature of the gyro sensor to provide temperature compensation for a signal from the gyro sensor, and an acceleration sensor for detecting a lateral acceleration of the vehicle, the antitheft system that is also equipped with an electronic stabilizer for automatically reducing a wheel speed based on a signal from the gyro sensor and a signal from the acceleration sensor, the antitheft system comprising:
an angle variation determination unit for determining an angle variation of a vehicle body angle at a predetermined interval based on the signal outputted from the acceleration sensor;
a theft detection unit for determining whether the vehicle is in a theft condition based on a comparison of the angle variation with a predetermined value;
a temperature variation calculator for calculating an amount of temperature variation of the temperature detected by the temperature sensor,
wherein the angle variation determination unit is configured to receive, as the temperature of the acceleration sensor, the temperature of the gyro sensor, and compensates the signal from the acceleration sensor based on the temperature sensed by the temperature sensor before determining the angle variation,
wherein the theft detection unit discontinues determination of the theft condition when the amount of the temperature variation is equal to or greater than a predetermined value.

12. The antitheft system as in claim 11, the temperature from the gyro sensor being received from a navigation system disposed in a secured space in the vehicle.

* * * * *